May 6, 1941.  E. W. PATTERSON  2,241,000
RACK AND PINION GEARING
Filed March 25, 1940   2 Sheets-Sheet 1
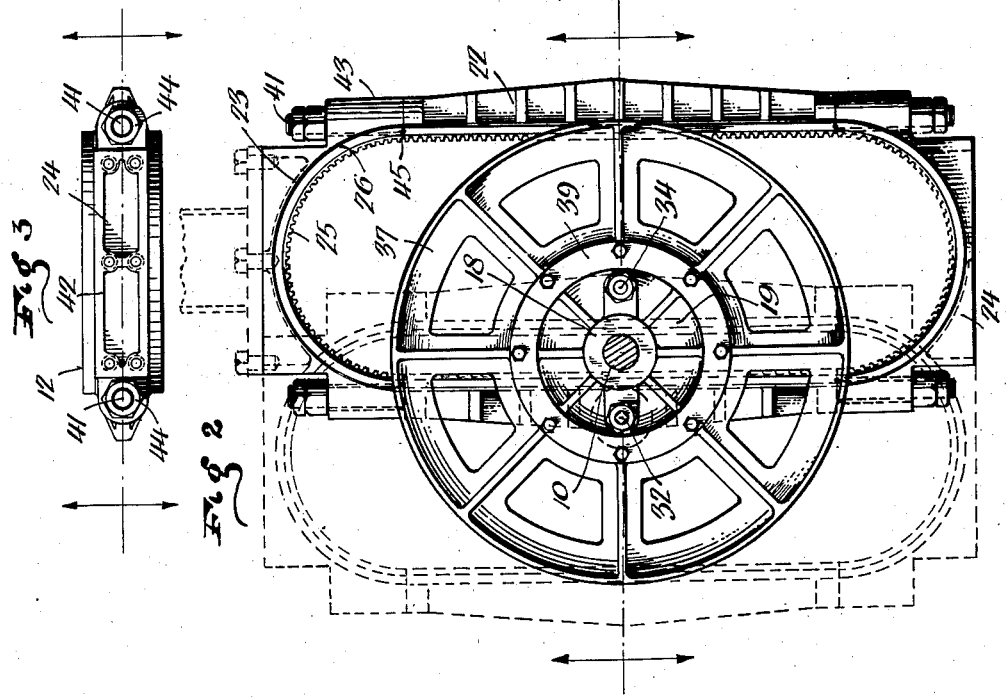
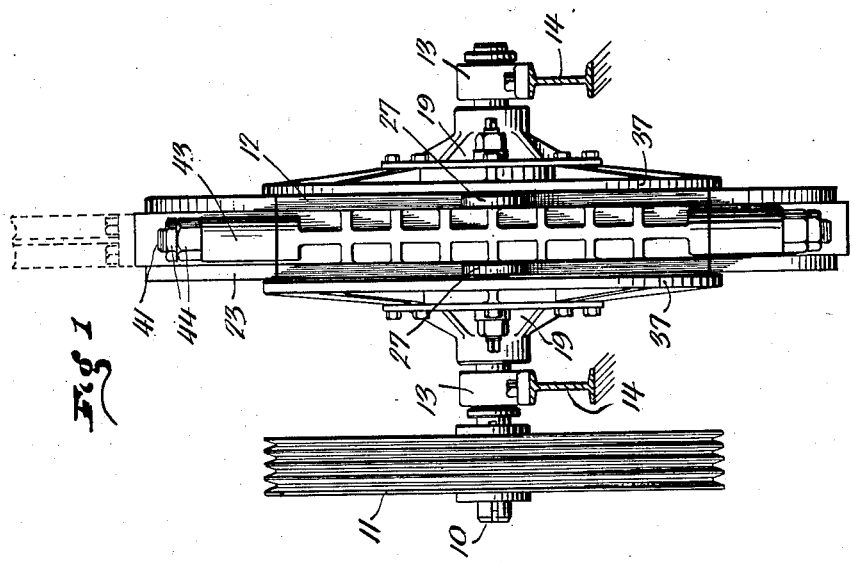
INVENTOR
EDGAR W. PATTERSON
BY
ATTORNEYS May 6, 1941.　　　E. W. PATTERSON　　　2,241,000
RACK AND PINION GEARING
Filed March 25, 1940　　　2 Sheets-Sheet 2

Edgar W. Patterson
INVENTOR

BY Myron S. Clear
ATTORNEY

Patented May 6, 1941

2,241,000

UNITED STATES PATENT OFFICE 2,241,000

RACK AND PINION GEARING

Edgar W. Patterson, Long Beach, Calif., assignor of one-half to C. M. O'Leary, Jr., Los Angeles, Calif.

Application March 25, 1940, Serial No. 325,823

10 Claims. (Cl. 74—30)

The present invention relates generally to mechanical movements and more particularly to a geared rack and pinion of the type and for the purpose fully set forth in my copending application under the same title, which was filed July 16, 1937, under Serial Number 154,081, and with respect to which my present application embodies certain refinements and improvements both as regards the complete gearing and the several parts which go to make up the gearing.

Since the filing of my above set forth application, both its test and practical use have demonstrated the great importance to be attached to the relative guidance of the rack and pinion members to the end that they may operate smoothly and evenly through an effective as well as a lengthy life, and more especially in the well pumping field where they are necessarily subjected to hard usage, are under heavy load, and must endure continuous use over long periods.

Among other things it has been found that too much stress cannot be laid upon the prevention of relative movement in any direction, between the rack and gear members, except that necessarily incident to their operation, and by this it is desirable to emphasize any relative movement likely to disturb their initially set tooth engagement. Wear once started in this respect, is ever increasing and fatal to lengthy useful life.

It may be said that my present invention is primarily directed to practical means in the nature of structural improvements adding materially to the durability of the gearing, as well as its service in point of time and its effectiveness throughout its useful life.

It is well known, and is set forth in my above mentioned application, that in such gearing effective means are essential to maintain the tooth engagement of the pinion and rack constant, that is, of a uniform, controlled depth of mesh. For this purpose, it is essential that the pinion, or relatively non-displaceable parts of the pinion assembly, furnish movable guides in contact with both the inner and outer surfaces of the rack member upon relatively opposite sides of its continuous line of teeth.

In addition to the foregoing I have found it to be essential that the means movably engaging the outer surface of the rack be of a character capable of quick, easy movement permitting great flexibility in its accommodation to instantaneous changes in the positions it must assume as the ends of the rack are turned, and of a nature not only adaptable to absolute uniformity at opposite sides of the rack gear, but also of a nature which will reduce to a minimum the disadvantages of inertia during its movements along the contour of the rack.

It is, further, essential that the rack be maintained at all times truly in a position at right angles to the axis of the pinion, and by this is meant both parallel side bars of a rack of the present type embodying teeth continuously along the internal surfaces of side and end members. In other words it is essential that guide means be present in effective contact not only with that side member then in direct engagement with the pinion, but also the other side member of the rack then distant from the pinion.

The problems thus presented are solved in the structure which forms the basis of this application and it is, among other things, the object of this invention to provide in practical structure the solution of such problems as well as others presented in the formation of the rack member itself.

These structures will more plainly appear in the course of the following detailed description thereof, and by reference to the accompanying drawings, which form a part of this specification and are illustrative of the best mode so far devised for carrying the invention into practice. In these drawings—

Figure 1 is a view of the gearing as it appears in side elevation.

Figure 2 is front elevation thereof.

Figure 3 is a top plan view of the rack member alone.

Figure 4 is a front view, partly in elevation and partly in section, of a portion of the rack member, the scale being enlarged, and Figure 5 is a horizontal sectional view taken centrally through the gearing substantially on line 5—5 of Figure 2.

Referring particularly to Figures 1 and 2, there is shown a driven shaft 10, which, for suitable connection with a source of power, may have a multiple grooved pulley 11 fast thereon. This shaft passes through the rack member generally indicated at 12 and, upon opposite sides of the latter, is rotatable in suitable, substantial bearing members 13 firmly secured to suitable stationary supports 14.

As best seen in Figure 5 the shaft 10 is shown as having a pinion 15 formed integrally thereon midway between stepped portions of the shaft which gradually reduce in diameter at opposite sides of the pinion to form a series of annular parallel seats for rollers and bearings to be individually referred to hereinafter.

Immediately upon opposite sides of the pinion 15 which may, of course, be formed as a separate part, keyed or otherwise stationarily mounted on shaft 10, the shaft provides annular seats for a pair of rollers 16 having reduced portions of their inner sides abutting the opposite sides of the pinion 15 immediately adjacent to the shaft so as to avoid any danger of marring the ends of the teeth thereof. At their outer sides rollers 16, which extend from the shaft as best seen in Figure 5, but slightly beyond the pinion 15, also have reduced extensions which abut a pair of anti-friction bearings 17 and are disposed around annular seats of the shaft 10 slightly smaller in diameter than those on which rollers 16 are mounted.

The bearings 17 support the inner sides of the axial tubular hub portions 18 of a pair of guide discs 19 of circular form, and engage in counterbores in said tubular portions 18, within which and against the outer closed ends of which, are seated other anti-friction bearings 20, situated upon annular seats of the shaft 10 somewhat smaller in diameter than the seats of bearings 17. The discs 19 are thus supported in a manner permitting their free rotative movement on the shaft 10 while at the same time they are, as presently appears, constrained to coact with the bearings 20 and 17, rollers 16 and pinion 15, in holding this assembly and the shaft 10 in relatively non-displaceable relation axially of the shaft.

As seen by a comparison of Figures 2, 3 and 4, the rack member 12 comprises a pair of parallel, straight side members 21 and 22, and a pair of semi-circular end members 23 and 24, each member having along its inner face its particular section 25 of the complete rack gear, as well as laterally outstanding reduced rims 26 which latter present smooth inner and outer guide surfaces continuously along and around the rack gear 25. The inner guide surfaces of these rims 26 are engaged by the rollers 16 which thus limit the depth of mesh of the rack gear 25 with the pinion 15.

The outer guide surfaces of the laterally projecting rims 26 of the rack member 12, are engaged by a pair of rollers 27 which thus oppose the inner rollers 16 and which are mounted externally of the rack, by means of anti-friction bearings, upon the inner adjacent ends 28 of a pair of stud shafts 29. These shafts 29, as plainly seen in Figure 5, are rotatably adjustably mounted through the guide discs 19 at points sufficiently spaced outwardly beyond the rack member to permit rollers 29 to engage the rack in the manner above stated.

Inwardly beyond the discs 19, stud shafts 29 have annular shoulders 30 to limit their outward movement, and the inner roller supporting ends 28 of these shafts, beyond shoulders 30, are eccentrically formed with respect thereto so that by rotating the shafts with respect to the discs, the rollers 27 may be adjusted toward and away from the rack rims 26 to thus provide for a nicety of adjustment of pressure contact by which the said rims 26 are freely lengthwise movable between rollers 16 and 27 without undue play.

For the above reason the outer ends of the stud shafts are externally threaded and have terminal polygonal extremities, as seen respectively at 31 and 32, beyond the outer faces of discs 19, the threaded portions 31 receiving lock or jam nuts 33 which by their engagement with the discs clamp the same in opposition to shoulders 30 whereby to effectively, normally lock the stud shafts 29 in adjusted position. The polygonal extremities 32 facilitate rotative adjustment of the stud shafts when nuts 33 are loosened to permit such adjustment either in the initial setting of the mechanism or when such adjustment, during use, becomes desirable or necessary.

Inwardly of the rack 12 and substantially diametrically opposite to the outer axially opposing stud shafts 29, the discs 19 are connected by a connecting bar or rod 34 in a manner constraining the two discs to simultaneous movements in adapting themselves to the straight and curved portions of the rack, movements which call for oscillation of the discs with respect to the shaft axis with such quick changes and rapidity of action that these discs are, in practice, formed of a metal of light weight such as aluminum, as distinguished from the tough, strain resisting steel with which the other of the foregoing parts are formed. The fact that the discs are thus of a very light weight material, plus the fact that they are of a similar diameter no larger than necessary to provide for the support of the rollers 27 and the ring discs of my invention as presently described, leaves to the discs 19, the ability to move instantly, and without developing undesirable inertia, as they oscillate with respect to the shaft in the swinging of the rollers 27 as they pass the juncture points between the straight side members 21 and 22 of the rack and the curved end members 23 and 24 thereof.

The connecting bar or rod 34 has threaded portions inwardly of, and outwardly beyond, the discs 19, the inner threads receiving lock nuts 35 against the inner surfaces of the discs, and the outer threads receiving similar lock nuts 36 against the outer surfaces of the discs, so that the two discs may in this way be rigidly united with one another and, being at opposite sides of the pinion 15, they thus coact as previously mentioned, to defeat any possibility of axial displacement of the shaft 10 and its associated parts.

Furthermore, since the connecting bar or rod 34 is effectively locked by lock nuts 35 and 36 against both the inner and outer surfaces of the discs 19, the latter are not only rigidly connected and braced in their spaced relation to insure their movement as a single unit, and complete the above mentioned control of the several parts of the shaft assembly, but such connections also constitute a means by which the desired spacing of the discs, which is an important matter, may be easily and quickly accomplished and accurately carried out.

In order that the rack member may be guided as a whole to maintain the same in a position definitely and truly in a line at right angles to the axis of shaft 10, both side portions of the rack are lapped and engaged at all times by the large side ring discs 37, whose inner faces contact the side edges of the rack rims 26, and whose inner perimeters seat on the outer peripheral surfaces of the roller carrying discs 19. Since these ring discs partake of rotary movement in practice, that is continuous rotation in the direction of movement of the rack 12, they must be separate as regards the discs 19 and, moreover, should be of a different and hard wearing material. The ring discs 37, while freely rotatable on the discs 19, are connected thereto in a manner by which their spacing, or the width of the rack guide channel formed between them, is definitely fixed by the above described spacing of the discs 19.

For these reasons, the ring discs merely utilize the roller carrying discs as supports and are provided at the inner sides of their inner perimeters with annular flanges 38 which overlap and extend inwardly beyond the peripheries of the discs 19. These inner flanges 38 are integrally formed with the ring discs, while to the outer sides of said discs are bolted confining rings 39, the bolts 40 of which enter the discs, and these rings 39 overlap, and extend inwardly beyond, the peripheries of discs 19, to thus complete the support of the ring discs 37 on the roller carrying discs 19 in relatively rotatable relation so that neither interferes with the very important functions of the other.

For purposes of increased strength and to render the same proof against warping, the roller carrying guide discs 19 and the ring discs guiding the rack are preferably formed with strengthening ribs radially of their outer faces, as shown clearly in Figures 1 and 2, and, in order that the rack may be accurately and quickly made in a manner insuring its lasting integrity after assembly of its several parts, the invention further proposes a construction of the rack to be now set forth.

Each of the side members 21 and 22 of the rack 12 is provided at its opposite ends with endwise projecting integral stud bolts 41, the centers or axes of which, when machined, serve as the centers for the machining of the other portions of these rack members including the cutting of the rack teeth. The end members 23 and 24 are formed with strengthening end boxes 42, one of which, on the upper end of the rack, may serve as a means of connecting these to one end of a pitman or other power transmitting member as indicated in dotted lines in Figures 1 and 2.

The end members 23 and 24 are also formed with laterally projecting longitudinally bored extensions 43 and when joined with the side members 21 and 22, these extensions receive the integral stud bolts 41 therethrough. Thus, as plainly seen in Figure 4, nuts 44 engaging the threaded ends of the stud bolts 41 against the outer ends of extensions 43, serve to effectively clamp the ends of the end members or sections of the rack in tight connection with the ends of the side members or sections.

Preferably the bores of the extensions 43 are slightly larger than the diameters of stud bolts 41 so that a slight adjustment is permitted at the time of original assembly in order to assure exact matching of the sections of the rack gear 25 as well as the inner and outer guide surfaces of the rack rims 26.

After the assembly of the rack members or sections in the above manner, transverse bores are drilled through the engaging ends of the end and side members, these bores being positioned through the rims, between the inner and outer guide surfaces thereof, at the inner ends of the stud bolts 41, as shown at the right hand side of Figure 4, the left hand side of this figure showing, in section, the parts as they appear before the formation of the bores. Into these drilled bores, locking pins 45 are forcibly fitted and, when once in place, they effectively prevent possibility of displacement of any of the members or sections of the rack relative to the others.

It is believed it will be obvious that, as thus shown and described, the invention provides a rack and pinion gearing which will be effective and efficient in use, as well as lasting and durable under heavy duty and constant service especially if it is operated, as it may readily be operated, within a casing or boxing forming an oil chamber so that the parts in their movement thoroughly lubricate every portion thereof.

It is also believed that while other mechanical expedients may be resorted to for accomplishing some of the featured results of the invention, those which have been shown and described are likely to be found best, since they have been tried and proven. I wish it to be understood however that any such changes and other departures from the details as shown and described, are reserved as a part of the invention within the claimed scope thereof.

Having thus fully described my invention, what I claim is:

1. Mechanism for translating rotary driving action to rectilinear driven action, comprising a rotatable drive shaft, a driving pinion in fixed relation on said shaft, a driven rack encircling said pinion, and having an endless internal gear in constant mesh with said pinion, and also having continuous inner and outer guide surfaces along opposite sides of said endless gear, guide rollers freely rotatable around the shaft and engaging the inner guide surfaces, discs also freely rotatable on the shaft, guide rollers having freely rotatable supports on said discs and engaging the outer guide surfaces, and other discs mounted on said roller carrying discs and of an external diameter at least the diameter of the rack, said last named discs being freely rotatable in contact with the side edges of the rack.

2. Mechanism for translating rotary driving action to rectilinear driven action, comprising a rotatable drive shaft, a driving pinion in fixed relation on said shaft, a driven rack encircling said pinion and having an endless internal gear in constant mesh with said pinion, means in movable engagement between the shaft and rack for maintaining the gear and pinion in constant mesh of uniform depth, and means freely rotatable around the shaft, forming a guide channel for the rack at right angles to the shaft for the full diameter of the rack at opposite sides of the shaft.

3. Mechanism for translating rotary driving action to rectilinear driven action, comprising a rotatable drive shaft, a driving pinion in fixed relation on said shaft, a driven rack encircling said pinion and having an endless internal gear in constant mesh with said pinion, means in movable engagement between the shaft and the rack for maintaining the gear and pinion in constant mesh of uniform depth, and means freely rotatable around the shaft and forming a guide channel for the rack at right angles to the shaft, said means being in the nature of ring discs of a diameter contacting with the edges of both sides of the rack.

4. Mechanism for translating rotary driving action to rectilinear driven action, comprising a rotatable drive shaft, a driving pinion in fixed relation on said shaft, a driven rack encircling said pinion and having an endless internal gear in constant mesh with said pinion, and also having continuous inner and outer guide surfaces, rollers in engagement with said guide surfaces for maintaining the rack gear and pinion in uniform depth of mesh, and freely rotatable means around the shaft at opposite sides of the rack for maintaining the rack in position at right angles to the shaft, and in contact with the side edges of the rack entirely thereacross.

5. Mechanism for translating rotary driving action to rectilinear driven action, comprising a rotatable drive shaft, a driving pinion in fixed relation on said shaft, a driven rack encircling said pinion and having an endless internal gear engaging the pinion, and continuous inner and outer guide surfaces, rollers in engagement with said guide surfaces for maintaining the rack gear and pinion in constant mesh of uniform depth throughout all portions of the rack as it swings from one side of the shaft to the other, and guide discs freely rotatable around the shaft at opposite sides of the pinion and forming a rack confining channel at right angles to the shaft and at opposite sides thereof for the full swing of the rack.

6. Gearing including a drive shaft, a driving pinion in fixed relation thereon, an endless rack around the pinion and having a continuous internal gear engaging the pinion, and means supported by said shaft and in rolling contact with the inner and outer surfaces of the rack for maintaining the rack and pinion in constant mesh of uniform depth, said means including a pair of discs freely rotatable on the shaft at opposite sides of the rack, shafts rotatably, adjustably fixed through said discs and having eccentric bearing portions at the inner ends thereof, and rollers freely rotatable on the said eccentric shaft ends and engaging the outer surfaces of the rack.

7. Gearing including a drive shaft, a driving pinion in fixed relation thereon, an endless rack around the pinion and having a continuous internal gear engaging the pinion, and means supported by the shaft and in rolling contact with the inner and outer surfaces of the rack for maintaining the rack gear and pinion in constant mesh of uniform depth, said means including a pair of discs freely rotatable on the shaft at opposite sides of the rack, and rollers freely rotatably supported by said discs at the inner sides thereof and adjustable with respect thereto toward and away from the axis of the shaft for adjustable pressure against the outer surface of the rack.

8. Gearing including a drive shaft, a driving pinion in fixed relation thereon, an endless rack around the pinion and having a continuous internal gear engaging the pinion, and means supported by the shaft and in rolling contact with the inner and outer surfaces of the rack for maintaining the rack gear and pinion in constant mesh of uniform depth, said means including a pair of discs freely oscillatable on the shaft at opposite sides of the rack, rollers freely rotatably supported by said discs at the inner sides thereof and in contact with the outer surfaces of the rack, and a rigid, adjustable connection between the said discs, extending through the rack and by means of which said discs may be adjusted toward and away from each other.

9. Gearing including a drive shaft, a driving pinion in fixed relation thereon, an endless rack encircling the shaft and having a continuous internal gear, and means supported by the shaft and in rolling contact with the rack for maintaining the rack gear and pinion in constant mesh of uniform depth, including a pair of discs freely oscillatable on the shaft at opposite sides of the rack, means rigidly and adjustably connecting said discs through the rack, for constraining the discs to simultaneous movement, and rollers having freely rotatable and radially adjustable support in connection with said discs at their inner sides diametrically opposite said disc connections for adjustable contact with the outer surface of the rack, said discs being of minimum diameter for the accommodation of said connections and rollers and being balanced thereby and of light weight to promote ready oscillation thereof.

10. Gearing as set forth in claim 9, further characterized by ring discs having their inner perimeters in freely rotatable and laterally non-displaceable connection with the outer peripheries of said roller discs, said ring discs forming between them a guide channel at opposite sides of the shaft for the rack to maintain the latter at right angles to the shaft at all times.

EDGAR W. PATTERSON.